United States Patent
Sinha et al.

(10) Patent No.: US 10,838,972 B2
(45) Date of Patent: Nov. 17, 2020

(54) STORING SERVICE ITEMS IN ASSOCIATION WITH VIEWS

(71) Applicant: Microsoft Corporation, Redmond, WA (US)

(72) Inventors: Amit K. Sinha, Bellevue, WA (US); Kavitha Balasubramanian, Redmond, WA (US); Dawid Kozlowski, Issaquah, WA (US); Michael I. Borysenko, Redmond, WA (US); Stephen Thomas Wells, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 488 days.

(21) Appl. No.: 14/210,109

(22) Filed: Mar. 13, 2014

(65) Prior Publication Data

US 2015/0261832 A1    Sep. 17, 2015

(51) Int. Cl.
*G06Q 10/10*  (2012.01)
*G06F 16/248*  (2019.01)
*G06F 3/0481*  (2013.01)

(52) U.S. Cl.
CPC .......... *G06F 16/248* (2019.01); *G06F 3/0481* (2013.01); *G06Q 10/10* (2013.01)

(58) Field of Classification Search
CPC .................................................... G06Q 10/107
See application file for complete search history.

(56) References Cited

U.S. PATENT DOCUMENTS

| | | | |
|---|---|---|---|
| 5,961,590 A | 10/1999 | Mendez et al. | |
| 7,783,712 B2 | 8/2010 | Azam et al. | |
| 8,266,220 B2 | 9/2012 | Bodin et al. | |
| 2004/0199529 A1* | 10/2004 | Clark | G06Q 10/107 |
| 2005/0223061 A1 | 10/2005 | Auerbach et al. | |
| 2008/0126353 A1* | 5/2008 | Baude | G06Q 10/107 |
| 2008/0306972 A1* | 12/2008 | Wilkin | H04L 51/066 |
| 2010/0312844 A1 | 12/2010 | Katis et al. | |
| 2012/0036265 A1 | 2/2012 | Meyler et al. | |
| 2012/0311060 A1 | 12/2012 | Beck et al. | |
| 2012/0323628 A1 | 12/2012 | Jaster et al. | |
| 2013/0275383 A1* | 10/2013 | McLarty | G06F 17/30179 707/663 |

FOREIGN PATENT DOCUMENTS

| | | |
|---|---|---|
| CN | 102929917 A | 2/2013 |
| CN | 103038740 A | 4/2013 |
| EP | 1783961 B1 | 5/2007 |

OTHER PUBLICATIONS

Farhad Manjoo, Sorted Affair, Aug. 31, 2010, Slate, pp. 1-4.*
(Continued)

*Primary Examiner* — Justin S Lee (57) ABSTRACT

Systems, methods, and software are described herein to support view-based storage. A service application that provides a user interface to a service receives data communicated by the service and identifies at least a service item to present in at least one of various views rendered in the user interface. The service application then identifies with which of the views to associate the service item and stores the service item in association with an identified view or views.

20 Claims, 8 Drawing Sheets

(56) References Cited

OTHER PUBLICATIONS

"International Preliminary Report on Patentability Issued in PCT Application No. PCT/US2015/019546", dated Apr. 5, 2016, 7 Pages (MS# 340222.02).
"International Search Report and Written Opinion Issued in PCT Patent Application No. PCT/US2015/019546", dated Jun. 12, 2015, 10 Pages. (MA# 340222.02).
"About the Outlook PST-File", Published on: Jun. 24, 2013, Available at: http://www.howto-outlook.com/faq/aboutpst.htm.
Mai Zheng, et al., "Understanding the Robustness of SSDs under Power Fault", In Proceeding of 11th USENIX Conference on File and Storage Technologies, Feb. 12, 2013, pp. 271-284.
"First Office Action and Search Report Issued in Chinese Patent Application No. 201580013664.4", dated Feb. 19, 2019, 9 Pages. (MS# 340222-CN-PCT).

\* cited by examiner

STORING SERVICE ITEMS IN ASSOCIATION WITH VIEWS

TECHNICAL FIELD

Aspects of the disclosure are related to computing hardware and software technology, and in particular, to the view-based storage of service items.

TECHNICAL BACKGROUND

In the field of computing hardware and software technology, users increasingly access and engage with a variety of online services on a routine basis. Their access is provided at least in part by way of user interfaces that include various objects and other interface elements with which they may interact. For instance, a user interface to an email service may include various objects and other elements representative of emails, menu items, and other interface elements.

A user interface may be rendered on a suitable computing device such that a user can interact with its interface elements as part of a user experience with a service. In some instances, the user interface is rendered by a client application running within the context of a browser application or some other execution environment that assists with driving the user interface in response to user interactions. For example, an email inbox may be presented in a user interface that includes a list of emails through which a user may scroll, thus shifting the focus of the application to a different location in the inbox. Rendering such state transitions within a client application involves the coordination between client resources that at times may lead to a sub-optimal user experience.

In a brief example, a user engaged with an email application may jump to a new folder while at nearly the same time new emails are received from an email service. In order to display the emails in the new folder, the client application initiates individual data requests for each email specified in the new folder. In addition, graphical objects and other content must be retrieved. The email data is translated into a format suitable for rendering with the graphical objects in a user interface.

Retrieving each individual email and translating the emails into a format suitable for presentation may take such a substantial amount of time that the rendering of the new folder in the user interface is appreciably delayed. Moreover, the client application may be slow to render the new folder and its contents in the user interface due to the newly arrived emails. The newly arrived emails must be processed and stored which can consume resources that would otherwise be dedicated to rendering the new folder.

OVERVIEW

Provided herein are systems, methods, and software for implementing view-based storage of data that allow service items to be stored and retrieved in association with identified views and that enhance the user experience.

In at least one implementation, a service application that supports a user interface to a service receives data communicated by the service and identifies at least a service item to present in at least one of various views rendered in the user interface. The service application then identifies with which of the views to associate the service item and stores the service item in association with an identified view or views.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein include enhancements to how service items, such as email items, appointments, and tasks, are stored and retrieved. An approach focused on views is taken whereby service items are stored in association with views such that, when a view is to be loaded into a user interface, a data structure associated with the view can be retrieved and various service items accessed therefrom. In this manner, repetitive and costly access attempts for each individual service item can be reduced or mitigated, which may accelerate the process of transitioning between and loading views.

In at least one implementation, a service application facilitates a user interface to a service. A user engaged with the user interface may navigate within and between various views. For instance, a user may navigate between a view of an inbox in an email application and a view of a sent messages folder, or between conversation views. In another example, a user may navigate between monthly, weekly, and daily views of a calendar. In yet another example, a user may scroll within a given view, such as by scrolling up or down a list of emails in an inbox or a news feed in a blog or social networking application.

In the background, the service application communicates with a service to exchange service-related information. An email application may communicate with an email service to send and receive email, for example, or to update the status of emails already received (such as to update whether or not they have been flagged, moved, deleted, or the like). A calendar application may interface with a calendar service to send and receive appointments or send and receive updates to existing appointments in another example. In these and other scenarios, the service application receives data from the service and identifies from within it at least a service item to present, eventually, in at least one of various views rendered in the user interface to the service.

Rather than store the service item as a self-contained data structure that is accessed on an individual basis, the service application stores the service item in association with a view or views to which it may correspond. The service item may then be retrieved along with other service items associated with the view by accessing a coherent data structure associated with the view. Accordingly, the service application identifies which view or views the service items is associated with and stores the service item in their corresponding data structures. Other elements may be included in the data structures, such as other service items and other components used when rendering a corresponding view. Thus, rather than repeating individual access operations for each service item in a view when rendering the view, fewer access operations may be performed for a view to access its data structure.

In some scenarios a given data structure may be a file to which various components and service items can be written. A service application can initiate a request to a file system to open the file from which it can then read out the components and service items used to render a view, rather than making repeated read requests for each service item. Such requests to a file system may occur in response to a variety of events, such as in response to a user navigating in a user interface from a preceding view to another view. In some implementations a single view is stored in a single data structure or file such that a one-to-one relationship exists between views and data structures. However, in some implementations multiple views may be stored in a single data structure. It may be appreciated that a variety of relationships between views and data structures are possible and may be considered within the scope of the present disclosure.

In some implementations the components stored in a data structure associated with a view may be stored in a presentation format ready for presentation in a view when rendered in a user interface to a service. To further accelerate the loading of views, a service item stored in the data structure may be translated from a format other than the presentation format into the presentation format. The service item may then be added to the other components in the data structure and may be stored in the same format in the data structure as the other components. It may be appreciated that translating a service item to a presentation format may occur prior to storing the service item in an identified data structure. The service item is thus ready to be processed for rendering in a user interface in the event that a corresponding view is selected by a user or otherwise surfaced for some other reason.

In some implementations an individual service item may be associated with multiple views. In addition, each view of a set of views may correspond to a different one of a set of data structures. In other words, each view may be given its own data structure. Thus, a service item that is associated with more than one view, or a subset of views, may be stored in more than one data structure, or a subset of the data structures.

Further enhancement to view-based storage may be provided by prioritizing the order in which service items are stored in association with views. In an example, each view of a set of views may be assigned a priority. A set of service items may then be stored in the data structures corresponding to the views in an order derived from the priority. For instance, an inbox view may be prioritized over a view of a custom folder. In this manner, it may be more likely that an incoming service item is available for immediate viewing.

In another enhancement, application state may be considered when balancing events against the arrival of new service items. The state of a service application may pertain to how a user is presently interacting with a user interface. If the user is scrolling through a view or actively moving between views, the data operations needed to handle such activity may be prioritized over those needed to store newly arrived service items. In contrast, if the state of a service application is relatively stable, or perhaps dormant with respect to the user interface, then incoming service items may be prioritized.

Figure 1A:
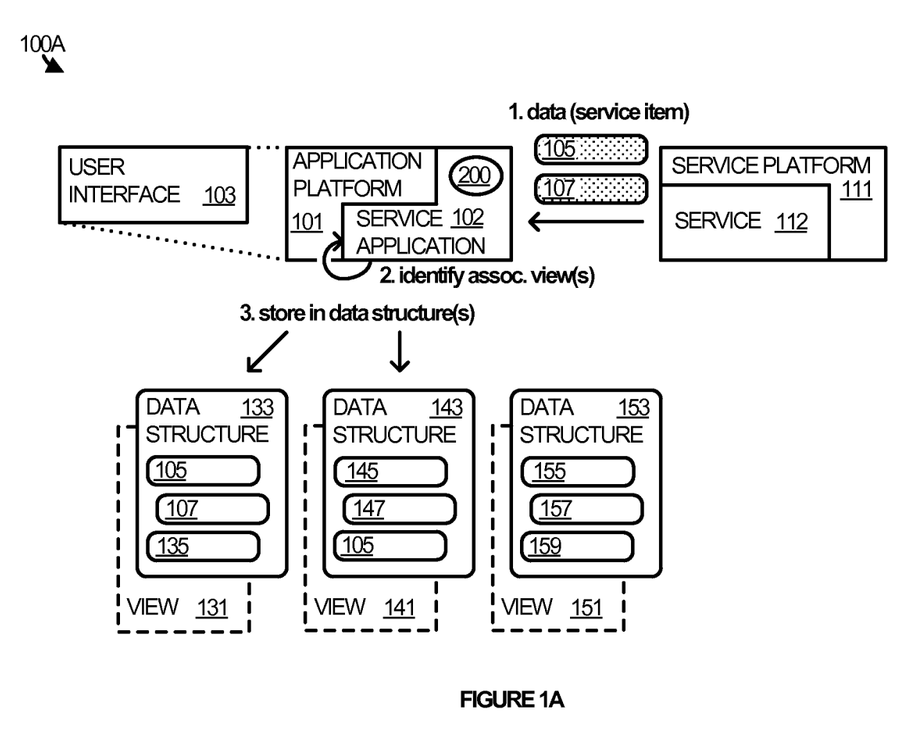
FIG. 1A illustrates a service environment and an operational scenario in an implementation where service items are received and stored in association with views.
Figure 1B:
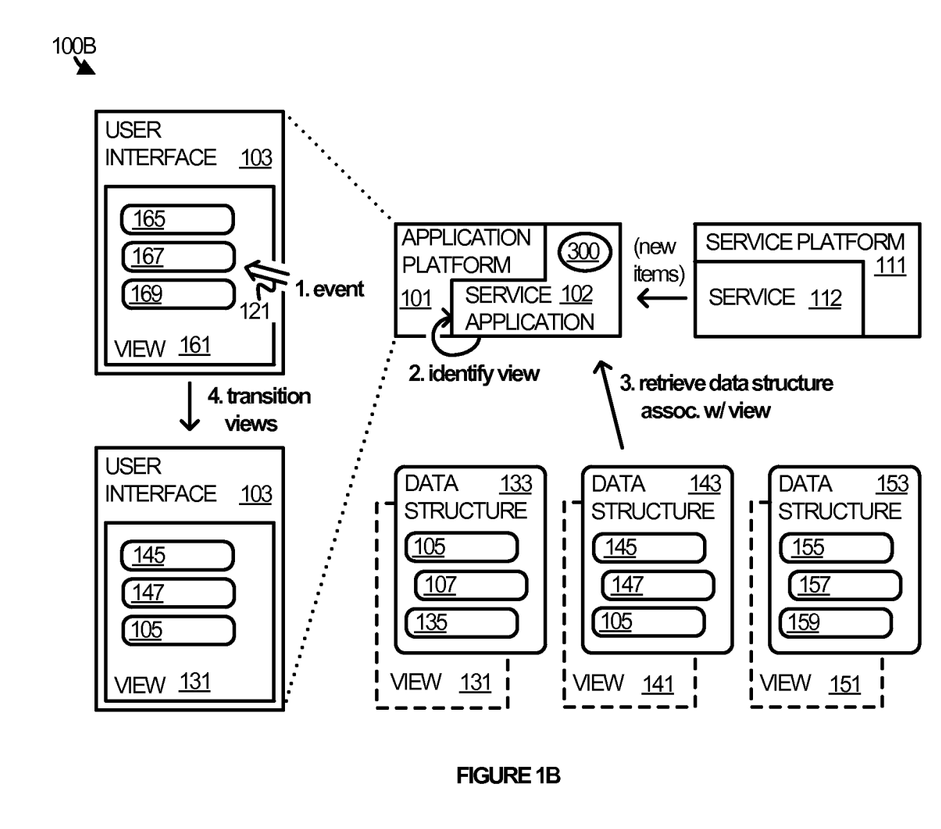
FIG. 1B illustrates a service environment and an operational scenario in an implementation where service items and components for a view are retrieved from storage.
Figure 2:
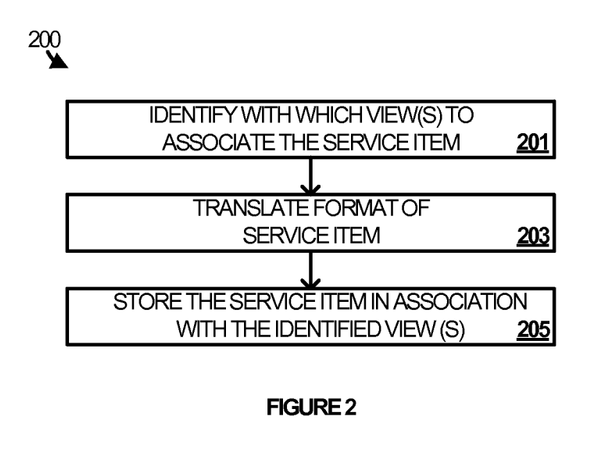
FIG. 2 illustrates a view-based storage process in an implementation.
Figure 3:
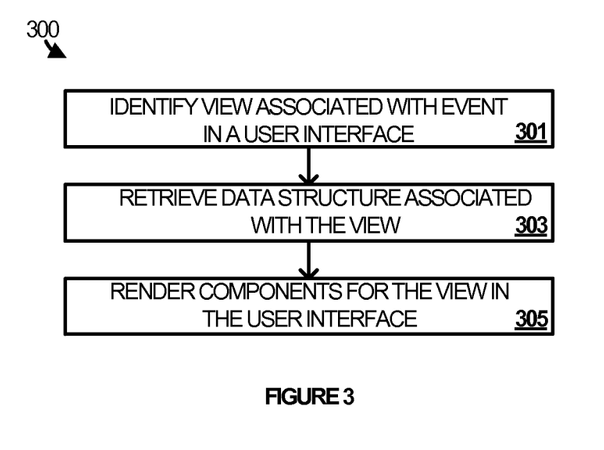
FIG. 3 illustrates a view-based retrieval process in an implementation.
Figure 4:
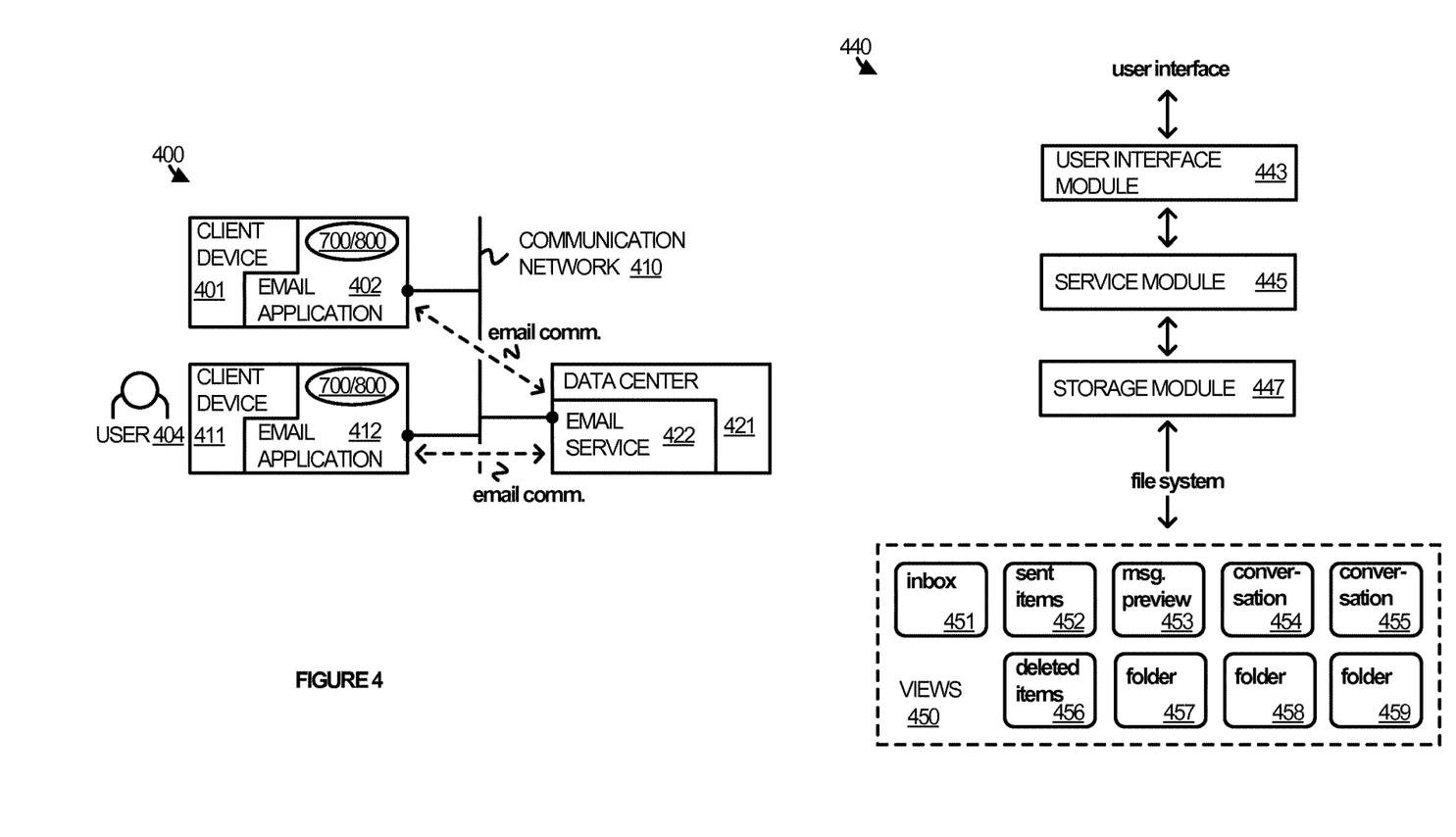
FIG. 4 illustrates an email environment and an application architecture in an implementation.
Figure 5:
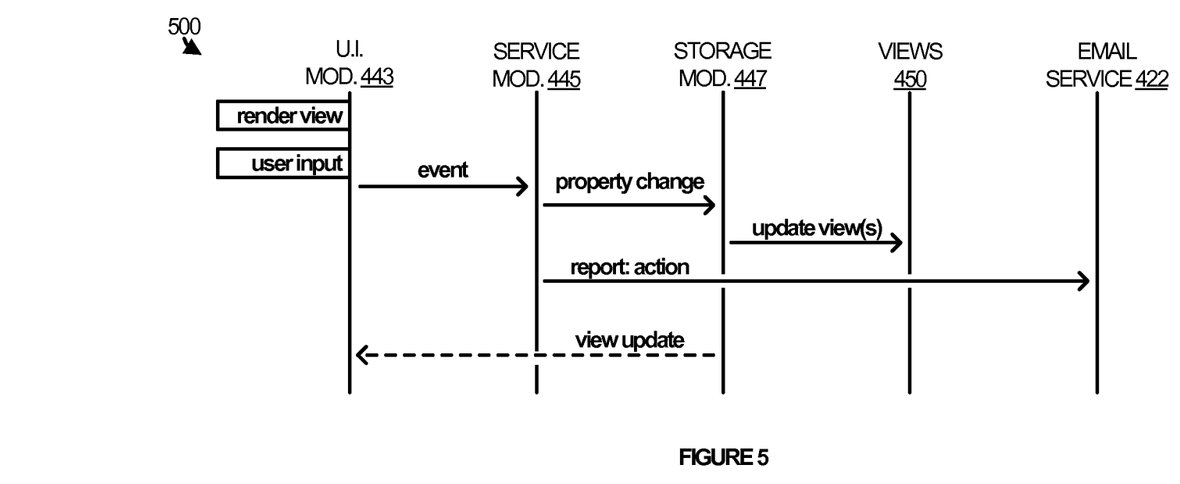
FIG. 5 illustrates an operational sequence in an implementation.
Figure 6:
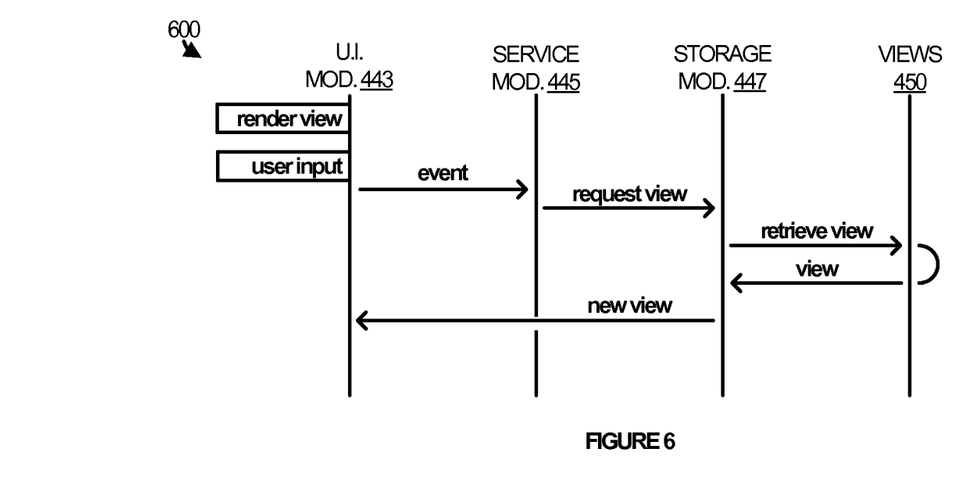
FIG. 6 illustrates an operational sequence in an implementation.
Figure 7A:
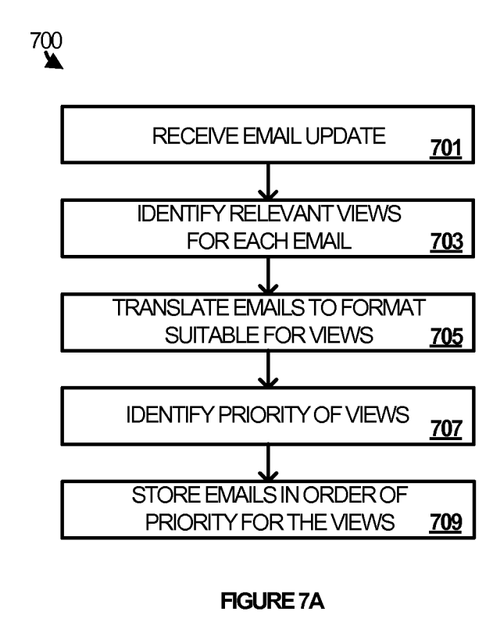
FIG. 7A illustrates a view-based storage process in an implementation and FIG. 7B illustrates a state-aware process for handling events and email updates in an implementation.
Figure 7B:
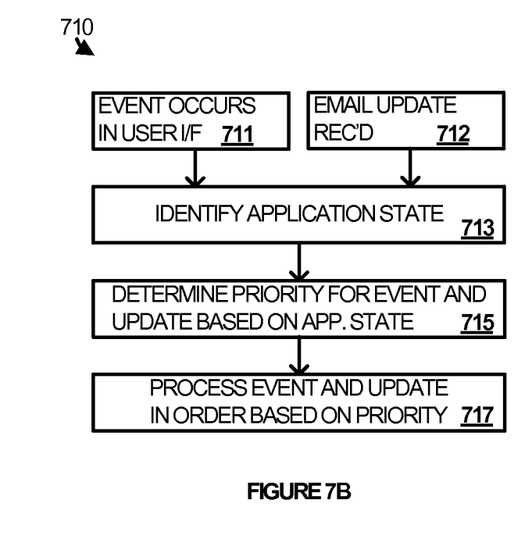
Figure 8:
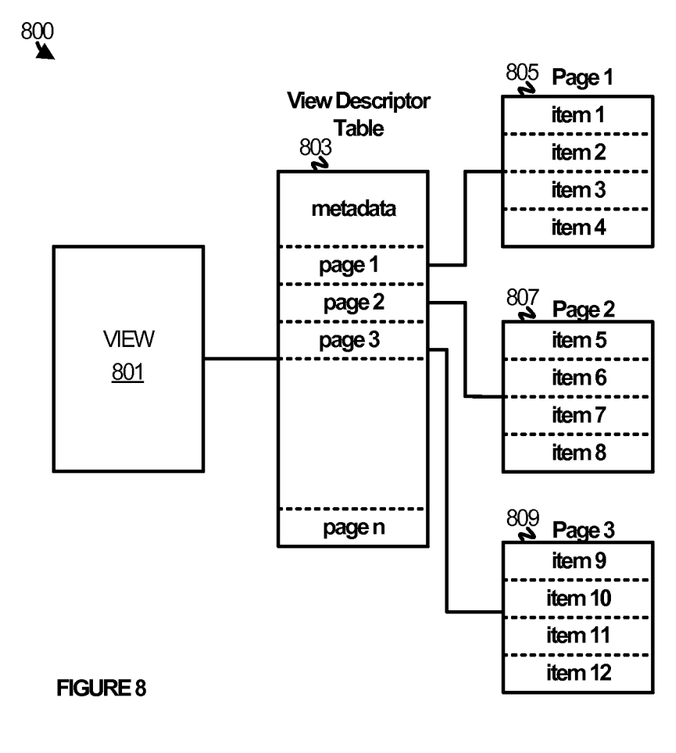
FIG. 8 illustrates a data structure model in an implementation.
Figure 9:
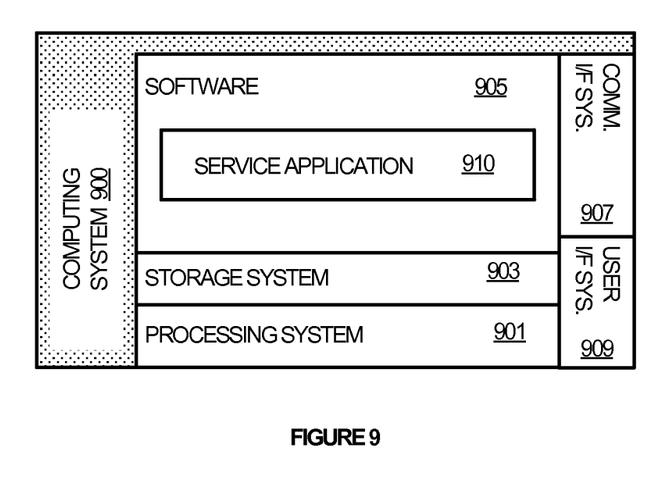
FIG. 9 illustrates a computing system in an implementation.

Referring now to the drawings, FIG. 1A and FIG. 1B illustrate a service environment and operational scenarios in which a service application employs view-based storage of service items to enhanced the storage of service data. FIG. 2 illustrates a process followed by a client application to store data in views, while FIG. 3 illustrates a process for retrieving data. FIG. 4 illustrates an email environment and an exemplary application architecture that may be used to facilitate a user experience with an email service. FIG. 5 and FIG. 6 illustrate exemplary data flows in various implementations while FIG. 7A and FIG. 7B illustrate two more processes for enhancing data storage to improve the user experience. FIG. 8 illustrates a model of a data structure associated with a view in an implementation. FIG. 9 illustrates a computing system representative of the various application platforms and service platforms discussed herein.

Turning to FIG. 1A, operational scenario 100A involves an application platform 101 on which service application 102 runs. Service application 102 communicates with service 112, running on service platform 111, to provide a user or users with access to service 112 through a user interface 103 (illustrated in FIG. 1B). User interface 103 includes various interface elements with which a user may interact by way of a user input, such as a mouse click, touch, gesture, spoken command, or any other type of user input. It may be appreciated that additional application platforms and additional client applications may be included in operational scenario 100A.

Application platform 101 is representative of any physical or virtual computing system, device, or collection thereof capable of running service application 102 and implementing process 200, process 300, or both. Examples of application platform 101 include, but are not limited to, smart phones, laptop computers, tablet computers, desktop computers, hybrid computers, gaming machines, smart televisions and virtual machines, as well as any variation or combination thereof, of which computing system 900 illustrated in FIG. 9 is representative.

Service application 102 is representative of any software application, module, component, or collection thereof, capable of implementing process 200, process 300, or both, to enhance how service data is stored and retrieved. Examples of service application 102 include, but are not limited to, email applications, calendar applications, real-time communication applications, blogging and micro-blogging applications, social networking applications, e-commerce applications, and gaming applications, as well as any other type of application capable of rendering a user interface and employing process 200 or process 300. Service application 102 may a locally installed and executed application, a streamed application, a mobile application, or any combination or variation thereof. In some implementations service application 102 may be a browser-based application that executes in the context of a browser application. Service application 102 may be implemented as a stand-alone application or may be distributed across multiple applications.

Service platform 111 is representative of any physical or virtual computing system, device, or collection thereof capable of hosting all or a portion of service 112. Examples of service platform 111 include, but are not limited to, server computers, web servers, application servers, rack servers, blade servers, virtual machine servers, or tower servers, as well as any other type of computing system, of which computing system 900 illustrated in FIG. 9 is representative. In some scenarios, service 112 may be implemented in a data center, a virtual data center, or in some other suitable computing facility. Examples of service 112 include, but are not limited to, web services, email services, real-time communication services, blogging and micro-blogging services, social networking services, e-commerce services, and gaming applications, as well as any other type of service, combination of services, or variations thereof. Service 112 may sometimes be referred to as a cloud services, an online service, an Internet service, or the like.

In operation, service application 102, when executing on application platform 101, communicates with service 112 to facilitate various aspects of a service. For example, service application 102 may communicate with service 112 to send and receive email, schedule appointments, engage in online games, post and consume content on a social network or blog, or for any other service-related reason. Service application 102 also renders user interface 103 through which a user may engage with service 112. A user may navigate through screens, menus, or other aspects of service 112, consume or compose content, participate in games, browse online merchandise, engage in communications, or experience service 112 in some other manner.

To facilitate the user experience, various views are presented in user interface 103 that may include user interface elements, such as icons, images, menus, or other objects with which the user may interact. User interface 103 may also include service items (or graphical representations thereof) associated with service 112. But before the service items can be presented in user interface 103, they are communicated by service 112 to service application 102. For instance, an email update may occur during which new emails are delivered to service application 102. In other examples, new appointments may be delivered, new contacts downloaded, new gaming profiles created, and the like.

Service application 102 employs process 200 when handling the incoming service items, represented in FIG. 1A by service item 105 and service item 107. An email, calendar item, blog post, news clip, and an instant message are non-limiting examples of a service item. Service item 105 and service item 107 are formatted in accordance with a service protocol understood by both service 112 and service application 102 to allow for the exchange of data. Service application 102 receives service item 105 and service item 107 and identifies with which views each of the service items is associated. In this scenario, various exemplary views include view 131, view 141, and view 151. A view may be representative of a perspective, window, or paradigm through which a user engages with service 112 through user interface 103. Examples of a view include, but are not limited to, an inbox view, a sent messages view, a custom folder view, a message preview panel, a monthly calendar view, a weekly view, and a daily view. Other types of views are possible and may be considered within the scope of the present disclosure.

Upon identifying an associated view or views for each of service item 105 and service item 107, service application 102 stores the service item in a given data structure associated with each view. In operational scenario 100A, data structure 133 is associated with view 131, data structure 143 is associated with view 141, and data structure 153 is associated with view 151. Furthermore in operational scenario 100A, it is assumed for exemplary purposes that service item 105 is associated with view 131 and view 141, while service item 107 is associated with only view 131. Neither service item is associated with view 151. As such, service item 105 is stored in data structure 133, along with component 135, which is representative of other components that may be stored in data structure 133 and used when rendering view 131. Service item 107 is also stored in data structure 133.

Service item 105 is also stored in data structure 143 because it is associated with view 141 in addition to view 131. Service item 105 is added to component 145 and component 147, which are representative of other components that may be stored in data structure 143 and used to render view 141. Data structure 153 includes component 155, component 157, and component 159, which are representative of other components that may be used when rendering view 151.

In some implementations, service application 102 may also translate or convert service item 105 and service item 107 from the service format in which they are communicated by service 112 to a presentation format suitable for presenting in user interface 103. Service item 105 and service item 107 can then be stored in data structure 133 and data structure 143 in the format or protocol in which they are rendered in user interface 103. In this manner, translating the service items at the time a view is requested may be avoided, further enhancing the user experience. The change in format with respect to service item 105 and service item 107 is represented by the change in fill pattern from when they are received by service application 102 relative to when stored in data structures 133 and 143. It may also be appreciated that the fill pattern (or lack thereof) of service item 105 and service item 107 is the same as the other components stored in data structures 133 and 143.

FIG. 1B illustrates operational scenario 100B in which a transition from one view 161 to another view 131 occurs, thereby necessitating the retrieval of data structure 133 from storage. In operation, a user experiences view 161 through user interface 103. View 161 may be representative of any view rendered by service application 102 and through which the user may engage with service 112. View 161 includes various components with which the user may interact, represented by component 165, component 167, and component 169. Components 165, 167, and 169 may be, for example, images, links, or other graphical items that provide the boundaries, layout, navigational tools, and structure of view 161. Components 165, 167, and 169 may also be data items, such as emails or appointments that include content for the user to consume. A variety components are possible and may be considered within the scope of the present disclosure.

In operational scenario 100B, an event 121 occurs with respect to component 167 that triggers a transition to view 131. The event 121 may be a mouse click, touch, gesture, spoken command, or some other type of user command input via a user interface system that displays user interface 103. The event 121 may also be representative of a background process or some other event that automatically triggers the transition to view 131.

In response to event 121 occurring, service application 102 identifies which view is implicated by the event. For example, service application 102 may identify which portion or component of view 161 was the subject of the event 121 and then which view is associated with that component. The component that is the subject of event 121 may include a link or some other instruction that drives the identification of the subsequent view.

In this example, event 121 occurs with respect to component 167, which for exemplary purposes is assumed to trigger the transition from view 161 to view 131. Accordingly, data structure 143 is retrieved from storage and includes component 145, component 147, and service item 105. Component 145, component 147, and service item 105 are presented in view 131 as it is rendered in user interface 103.

It may be appreciated from the foregoing operational scenarios that view-based storage of service items allows a service application to surface views in a user interface faster than in the past. Rather than making multiple read requests to obtain the service items relevant to a view, and then having to translate the service items to an appropriate presentation format, view-based storage allows a service application to merely retrieve a coherent data structure that includes the components and service items for a given view. In addition, the service items may already be stored in a presentation-friendly format such that the step of translating their format may be avoided. These techniques limit the number of read requests made by the service application and accelerate the loading of views.

While the foregoing examples illustrate that service items are stored in coherent data structures associated with views, it may be appreciated that in some scenarios the service items may still be stored in other types of data structures or independently. A service item may for instance be stored in a data structure associated with a view and in a presentation-friendly format, while at the same time a copy of it may be stored in its original format in a different data structure or independently as its own data structure.

FIG. 2 illustrates process 200 in more detail that may be employed by service application 102 when handling incoming data from service 112. Service 112 item communicates data, which may include new service items, in the course of providing a service to service application 102. As the new service items arrive, they are written to storage. But rather than merely storing each service item as an individual data structure (and in the format in which they are communicated), service application 102 stores the service items in coherent data structures associated with a view.

Accordingly, service application 102 identifies which view or views are associated with a given service item (step 201). A service item may be associated with just one view, but in some scenarios may be associated with multiple views. An example includes an email that may be associated with both an inbox view and a conversation view. Another example includes an appointment that may be associated with a monthly view of a calendar and a weekly view of the calendar.

Next, the format of each service item is translated or converted into a presentation format suitable for rendering in a user interface (step 203). This is performed so that a service item need not be reformatted when being retrieved from storage for rendering in a user interface. In some scenarios, a service item may be formatted in accordance with a communication protocol, such as an email, instant messaging, or blogging protocol. The presentation-friendly format may thus be a format suitable for handling by a presentation protocol and ultimately presentation in a user interface.

Service application 102 then stores each service item in association with the identified view or views for the service item (step 205). Storing a service item may involve opening a data structure associated with a view and writing the service item to the data structure. In other implementations, a service item may be written to a block or range in memory generally associated with a view, even if not defined as a discrete data structure. Other mechanisms for storing a service item are possible and may be considered within the scope of the present disclosure.

FIG. 3 illustrates process 300 which may be employed by service application 102 when retrieving data from storage. In operation, an event may occur that triggers service application 102 to retrieve data from storage. The event may be, for example, a mouse click, touch, gesture, spoken command, or other user input made with reference to an item, folder, module, or some other aspect of service application 102 to indicate their desire to navigate to that aspect. Other events are possible, such as triggers initiated by background processes.

In response to the event occurring, service application 102 identifies which view is associated with the event (step 301). In some cases the view associated with an event may be self-evident from the event. For instance, a selection of a folder indicates an intention to navigate to the folder. Other cases may be determined programmatically from the object or component implicated by an event. For instance, hovering over or otherwise selecting a message an in inbox may trigger service application to render a message preview within a preview panel. In any case, service application 102 identifies the relevant view.

After identifying the relevant view, service application 102 retrieves an associated data structure that includes various service items and other components to be rendered in the view (step 303). Retrieving the data structure may involve making a file open request to open the data structure in memory. The service items and components may then be read from the data structure and processed in accordance with a user interface protocol in order to render the view in a user interface.

Lastly, service application 102 renders the service items and components in a user interface in order to present the view (305). The service items and components together form the view. For instance, a list of emails as well as images and other graphics can be rendered together to form an inbox view. Likewise, a list of appointments, images, and other graphics can be rendered together to form a monthly view of a calendar. In a social networking example, a set of posts, images, and other graphics can be rendered together to form a news feed view of a person's social network. In yet another example, a set of blog posts, images, and other graphics can be rendered to form a view of a blog.

FIG. 4 illustrates an email environment 400 in an implementation in which enhanced data storage and retrieval may be employed. Email environment 400 includes client device 401 and client device 411 on which email application 402 and email application 412 are implemented respectively. User 404 is associated with at least one of client devices 401 and 411 and email applications 402 and 412. Email environment 400 also includes data center 421 and communication network 410 over which data center 421 communicates with email application 402 and email application 412 by way of client device 401 and client device 411. Email service 422 is hosted in data center 421.

Client device 401 is representative of any physical or virtual computing device capable of executing email application 402 and communicating over communication network 410 to allow email application 402 to interact with email service 422. Examples of client device 401 include, but are not limited to, smart phones, tablet computers, laptop computers, desktop computers, cross-category hybrid computers, and virtual machines, as well as variation or combination thereof. Computing system 900, illustrated in FIG. 9, is representative of one such computing device.

Email application 402 is representative of any email application, module, component, or collections thereof capable of running on client device 401 and communicating with email service 422 over communication network 410. Email application 402 is also capable of implementing process 700, process 710, or both, illustrated in FIG. 7A and FIG. 7B. Email application 402 may integrated in another application or may run within an execution environment provided by another application, such as a browser application. However, in some scenarios email application 402 may also be a stand-alone application that is locally installed and executed. Email application 402 may also be representative of any personal information management application that includes functions other than or in addition to email functionality, such as calendar functions, tasks functions, and the like.

Client device 411 is representative of any physical or virtual computing device capable of executing email application 412 and communicating over communication network 410 to allow email application 412 to interact with email service 422. Examples of client device 411 include, but are not limited to, smart phones, tablet computers, laptop computers, desktop computers, cross-category hybrid computers, and virtual machines, as well as variation or combination thereof. Computing system 900, illustrated in FIG. 9, is representative of one such computing device.

Email application 412 is representative of any email application, module, component, or collections thereof capable of running on client device 411 and communicating with email service 422 over communication network 410. Email application 412 is also capable of implementing process 700, process 710, or both, illustrated in FIG. 7A and FIG. 7B. Email application 412 may integrated in another application or may run within an execution environment provided by another application, such as a browser application. However, in some scenarios email application 412 may also be a stand-alone application that is locally installed and executed. Email application 412 may also be representative of any personal information management application that includes functions other than or in addition to email functionality, such as calendar functions, tasks functions, and the like.

Data center 421 is representative of any collection of computing equipment capable of hosting email service 422. Data center 421 may be representative of a physical data center, a virtual data center, a single data center, multiple data centers, or any combination or variation thereof. Email service 422 is representative of any email service that is implemented in software and that may be hosted in data center 421. Email service 422 may be provided as a stand-alone service or may be provided along with or as an integrated part of other services, such as such as calendaring services, unified communications services, social networking services, e-commerce services, productivity services, and gaming services, as well as any other suitable service, all of which may be hosted in data center 421.

Communication network 410 is representative of any network or collection of networks over which client device 401 and client device 411 may communicate with data center 421. Examples of communication network 410 include, but are not limited to, wired and wireless networks, internets and intranets, and the Internet, as well as any other type of network, combination or networks, or variations thereof.

FIG. 4 also illustrates application architecture 440 which is representative of a possible architecture for email application 402 and email application 412. Application architecture 440 includes a user interface module 443, service module 445, and storage module 447. Application architecture 440 also includes views 450, an inbox view 451, a sent items view 452, a message preview view 453, a conversation view 454, a conversation view 455, a deleted items view 456, and folder views 457, 458, and 459.

Service module 445 is any software component, module, or collections thereof capable of communicating with email service 422, user interface module 443, and storage module 447. Service module 445 handles the sending and receiving of email, communicating with storage module 447 to store and retrieve data, and communicating with user interface module 443 to render a user interface.

User interface module 443 is any software component, module, or collections thereof capable of communicating with service module 445 and various other software components that function to provide a user interface. For instance, user interface module 443 may communicate with operating system components to drive a user interface system.

Storage module 447 is any software component, module, or collection thereof capable of communicating with service module 445 and a file system, or other operating system components, to facilitate the storing and retrieving of data.

In operation, user interface module 443 receives user input information from lower layer components indicative of a user input and communicates the event to service module 445. Service module 445 analyzes the event to determine what action has occurred with respect to an email or emails. The action may be reported to email service 422 such that email service 422 can maintain a synchronized or master version of a mail store, mailbox, or other collection of emails for user 404. Service module 445 may also communicate an update to storage module 447 to update a view that is effected by the action. Storage module 447 interfaces with views 450 via a file system to implement the update.

In addition to responding to events communicated through user interface module 443, service module 445 may also respond to email updates communicated by email service 422. These may include new emails that are to be stored and possibly rendered in a view, but may also include updates to existing emails for which a property change of other update is to be implemented in the store.

FIG. 500 illustrates an operational sequence 500 representative of one exemplary data flow that may occur when a user input occurs. In operation, user interface module 443 renders a view in a user interface. The view may be any of the various views 450 illustrated in FIG. 4, such as inbox view 451. User 404 provides a user input via the user interface with respect to an individual email included in the view, such as a mouse click, touch, gesture, or command that is considered an event by user interface 443. User interface module 443 communicates the event to service module 445.

Service module 445, in response to the event, determines what change if any to make to the relevant email. In this example, service module 445 determines that a property change is in order. For instance, the state of an email may have been changed from a flagged state to an un-flagged state, from a read state to an unread state, and so on. Service module 445 communicates the property change to storage module 447 for storing in views 450.

Storage module 447 receives the property change from service module 445 and determines which views may be impacted by the property change. One or more views may be effected as the subject email may be stored in multiple views. Storage module 447 then opens a data structure associated with each identified view and stores the property change. In some cases, implementing the property change may involve setting a bit, changing the value of a variable, or making some other change to a piece of data stored in the data structure that indicates the state of an email. However, implementing the property change may also involve altering image data or other presentation-related data specific to a presentation format in which the subject email is stored in the data structure. The property change may be surfaced in the rendered view by way of a view update communicated by storage module 447 to user interface module 443, assuming an associated view is presently loaded in the user interface.

In addition to communicating the property change to storage module 447, service module 445 also reports the action to email service 422. For instance, service module 445 may report that the subject email had been flagged or un-flagged, or changed from a read state to an unread state. Other examples include reporting that an email had been deleted locally, moved to another folder, and the like. Such communication with email service 422 is in accordance with an action-reporting paradigm that calls for reporting actions that occur locally in the user interface rather than communicating entire objects and their properties. In reply, email service 422 communicates down data that may include objects and their properties. While not illustrated in FIG. 5, any new data may be processed for storing in an associated one or more of views 450.

FIG. 6 illustrates another operational sequence, but one that pertains to the retrieval of a view. In operation, user interface 443 drives the rendering of a view in a user interface, such as inbox view 451. User 404 interacts with the user interface to provide a user input indicative of an intent to navigate away from the initial view to another, different view. For example, user 404 may click on, touch, or otherwise select another folder, an email item, or some other object or component that triggers a transition between views. User interface 443 communicates the event to service module 445, which then identifies which view has been selected.

Service module 445 then communicates with storage module 447 to request the identified view. Such a request may be made by specifying the particular view. Storage module 447 must then identify which data structure is associated with the requested view. Storage module 447 communicates a file open request to a file system to open the data structure that holds the various email items and other components for the identified view. The service items and components are read out of the data structure and provided for rendering by user interface module 443 in the user interface. While FIG. 6 illustrates that the new view is communicated directly from storage module 447 to user interface module 443, it may be appreciated that service module 445 may act as an intermediary. In addition, pointers or other data transfer access techniques may be utilized such that the components of the new view need not actually be moved, but rather access to the relevant data structure is granted to user interface module 443.

FIG. 7A illustrates a process 700 that may be employed by application architecture 440, and by extension email application 402 or email application 412, to facilitate enhanced data storage. In operation, service module 445 receives an email update from email service 422 (step 701). Service module 445 then identifies the relevant view or views for each email (step 703). Alternatively, storage module 447 may be responsible for performing this step. Once identified, the emails are translated to a presentation format suitable for rendering in a view (step 705).

A priority of views is then identified that relates to an order in which emails will be stored (707). Priority may be given to one view over another or others such that emails associated with that view are written to its associated data structure (file) ahead of other emails associated with other views. This is so that high-priority views are ready for rendering over other views that are of a lower priority. For example, because an inbox tends to be used more often than a custom folder, an inbox view may be given priority over a view of the custom folder. In another example, because a monthly view of a calendar is used more often than a daily view of the calendar, the monthly view may be given priority. As such, emails associated with the inbox view will be written to its associated data structure ahead of emails associated with other lower priority views.

Each new email can then be stored in a data structure for each associate view based on the order of priority assigned to each view (step 709). Thus, all of the emails associated with an inbox view can be stored in its corresponding data structure, followed by storing all of the emails associated with the next view stored in its corresponding data structure, and so on. As with other examples, it may be appreciated that a given email may belong to multiple views and thus may be stored in multiple data structures.

FIG. 7B illustrates another process 710 that may be employed by application architecture 440, and by extension email application 402 and email application 412, to improve data storage and retrieval operations. In operation, an event may occur in a user interface (step 711). At substantially the same time an email update may be received from email service 422 (step 712). In the past, such occurrences may lead to sub-optimal user experiences as a transition between views or other user interface operations may be delayed as emails are stored to disk. In a departure, application state is considered when determining whether to prioritize the event over the email update or the email update over the event. Accordingly, application state is determined (step 713) by application architecture 440. The relative priority of the event and the email are determined based on the application state (step 715), which are then processed in order of their priority (step 717).

In an example, the event may be include scrolling down or through a view in the user interface. In some scenarios scrolling may involve moving quickly through a list of emails. As a user scrolls over a list of emails, she may stop on any given one. Thus, priority can be given to rendering views associated with the scrolling over storing new emails. However, it remains important to store incoming emails. Thus, if the email application is generally at rest, then priority may be given to storing new email. In another example, a user may be navigating through days in a calendar when a new appointment is received. Priority may be given to retrieving views associated with the days rather than storing the appointment. In yet another example, a user may be browsing photos on a social networking website as new messages or news feeds are received. Priority may be given to retrieving views associated with the photos rather than storing the new messages or news feeds.

FIG. 8 illustrates a data structure model 800 in accordance with which a view may be stored in some implementations. Data structure model 800 allows only a portion of a view to be retrieved and loaded into memory, rather than handling an entire view. A view 801 may include a collection of pages 805, 807, 809 that are referenced by a view descriptor table 803. The view descriptor table 803 describes which pages are relevant to which items. When an item is selected or navigation occurs in a view that invokes an item that has not yet been retrieved from disk, view descriptor table 803 may be accessed to determine which associated pages to load. Pages enable a portion of a view to be loaded into memory from disk, rather than loading an entire view, when items associated with that view are invoked.

In an email-related example, an inbox view may include fifteen pages of items, but only a few of the pages need be loaded into memory at a time. Thus, the first three pages of an inbox view can be retrieved from disk and loaded. As a user scrolls threw the inbox view to new items, pages containing those items will need to be fetched and loaded into memory. In this manner, items can be loaded from pages and presented in a user interface on a per-page basis, rather than waiting for an entire view to be loaded. It may be appreciated with respect to the various implementations discussed above that loading or retrieving a view from storage may involve retrieving an entire view or retrieving just a portion of a view- or a set of pages—as discussed herein with respect to FIG. 8.

FIG. 9 illustrates a computing system 900 that includes service application 910 and that is representative of application platform 101, client device 401, and client device 411, as well as any other type of device, system, or collections thereof suitable for implementing a service application or an email application. Examples of computing system 900 include, but are not limited to, desktop computers, laptop computers, tablet computers, notebook computers, mobile computing devices, smart phones, cell phones, media devices, and gaming devices, as well as any other type of physical or virtual computing machine capable of implementing service application 910.

Computing system 900 may be implemented as a single apparatus, system, or device or may be implemented in a distributed manner as multiple apparatuses, systems, or devices. Computing system 900 includes, but is not limited to, processing system 901, storage system 903, software 905, communication interface system 907, and user interface system 909. Processing system 901 is operatively coupled with storage system 903, communication interface system 907, and user interface system 909.

Processing system 901 loads and executes software 905 from storage system 903. When executed by processing system 901, software 905 directs processing system 901 to operate as described herein for service application 102, email application 402, email application 412, and application architecture 440. Computing system 900 may optionally include additional devices, features, or functionality not discussed for purposes of brevity.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations, or variations thereof.

Storage system 903 may comprise any computer readable storage media readable by processing system 901 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 901 or possibly other systems.

Software 905 may be implemented in program instructions and among other functions may, when executed by processing system 901, direct processing system 901 to operate as described herein with respect to the various operational scenarios disclosed herein. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 901.

In general, software 905 may, when loaded into processing system 901 and executed, transform a suitable apparatus, system, or device (of which computing system 900 is representative) overall from a general-purpose computing system into a special-purpose computing system customized to facilitate view-based storage of service items as described herein for each implementation. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1A as an example, through the operation of a computing system or systems of which computing system 900 is representative, transformations may be performed with respect to data structure 133 and data structure 143. As an example, components associated with view 131 and view 141 are stored in data structure 133 and data structure 143 respectively. New service items are received in service application 102 and are responsively stored in data structure 133 and data structure 143, thereby changing them to a second, different state. In another example illustrated in FIG. 1B, user interface 103 initially includes view 161 but transitions to view 131 in response to event 121. Other examples of transformations are possible and may be considered within the scope of the present disclosure.

It should be understood that computing system 900 is generally intended to represent a computing system or systems on which software 905 may be deployed and executed in order to implement view-based storage. However, computing system 900 may also be suitable as any computing system on which software 905 may be staged and from where software 905 may be distributed, transported, downloaded, or otherwise provided to yet another computing system for deployment and execution, or yet additional distribution.

Communication interface system 907 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 900 and any other computing system (not shown) may occur over a communication network or networks and in accordance with various communication protocols, combinations of protocols, or variations thereof. Examples of communication networks over which computing system 900 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof. In some implementations, information may be exchanged in accordance with any of a variety of email protocols, including without limitation POP (Post Office Protocol), IMAP (Internet Message Access Protocol), MAPI (Messaging Application Programming Interface), HTTP mail, or any other suitable email protocol.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 901 in support of the various user input and output devices discussed above. Separately or in conjunction with each other and other hardware and software elements, the user interface software and user interface devices may support a graphical user interface, a natural user interface, or any other type of user interface. For example, user interface 103 may be presented through user interface system 909. In addition, user input made with respect to the user interfaces can be input via user interface system 909.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon comprising a service application for facilitating a user interface to a service that, when executed by a processing system, directs the processing system to at least:
enable presentation, in the user interface, of a view of a plurality of views, wherein each view of the plurality of views corresponds to a different one of a plurality of data structures to which service items are written;
identify, from data communicated by the service, at least a service item to present in at least one other view of the plurality of views;
prior to receiving an input for navigating to the other view, translate a format of the service item into a presentation format of the other view, wherein the presentation format of the other view differs from the format of the service item; and
prior to receiving the input for navigating to the other view, store the service item:
in the presentation format of the other view in association with at least the other view, and
in the plurality of data structures in an order based at least on a priority assigned to each of the plurality of views.

2. The one or more computer readable storage media of claim 1 wherein, to store the service item in the presentation format of the other view in association with at least the other view, the service application directs the processing system to store the service item in a data structure that comprises a plurality of components associated with the other view and formatted for surfacing in the presentation format of the other view.

3. The one or more computer readable storage media of claim 2 wherein, to enable presentation, in the user interface, of the other view, the service application further directs the processing system to:
open the data structure, and
based on a single request, read the service item and the plurality of components from the data structure.

4. The one or more computer readable storage media of claim 3 wherein, in response to a navigation in the user interface from the view to the other view, the service application further directs the processing system to:
identify that the other view is implicated by the navigation in the user interface;
responsively communicate a request to a file system to retrieve the data structure associated with the other view; and
surface the plurality of components in the user interface, including the service item.

5. The one or more computer readable storage media of claim 1 wherein the presentation format of the other view comprises a format in which to present the service item in the user interface.

6. The one or more computer readable storage media of claim 1 wherein the service application further directs the processing system to:
translate the format of the service item into a presentation format of the view, wherein the presentation format of the view differs from the format of the service item; and
store the service item:
in the presentation format of the view in association with the view; and
in the plurality of data structures in the order based at least on the priority assigned to each of the plurality of views.

7. The one or more computer readable storage media of claim 1 wherein the service application further directs the processing system to:
identify a subset of the plurality of views comprising more than one of the plurality of views; and
to store the service item in a subset of the plurality of data structures that corresponds to the subset of the plurality of views.

8. The one or more computer readable storage media of claim 1 wherein the service application further directs the processing system to:
store the service item in association with a page of a plurality of pages, wherein the other view includes the plurality of pages; and
in response to receiving the input for navigating to the other view:
identify, by accessing a table, the page; and
load the page into memory.

9. The one or more computer readable storage media of claim 1 wherein the service comprises at least one of an email service and a calendar service and wherein the service item comprises at least one of an email and a calendar item.

10. An apparatus comprising
one or more computer readable storage media; and
program instructions stored on the one or more computer readable storage media and comprising an email application executable by a processing system to at least render a user interface to a service, wherein the email application comprises:
a service module that when executed directs the processing system to:
enable presentation, in the user interface, of a view of a plurality of views, wherein each view of the plurality of views corresponds to a different one of a plurality of data structures to which service items are written;
identify data from the service comprising an email for subsequent presentation in at least one other view of the plurality of views in the user interface;
prior to receiving an input for navigating to the other view, translate a format of the email into a presentation format of the other view, wherein the presentation format of the other view differs from the format of the email; and
a storage module that when executed directs the processing system to store the email:
in the presentation format of the other view in association with at least the other view; and
in the plurality of data structures in an order based at least on a priority assigned to each of the plurality of views.

11. The apparatus of claim 10 wherein, to store the email in the presentation format of the other view in association with at least the other view, the storage module directs the processing system to store the email in a data structure that comprises a plurality of components associated with the other view and formatted for surfacing in the other view.

12. The apparatus of claim 11 wherein, the service module further directs the processing system to:
open the data structure, and
based on a single request, read the email and the plurality of components from the data structure.

13. The apparatus of claim 12 wherein, in response to a navigation in the user interface from the view of the plurality of views to the other view, the storage module further directs the processing system to:
identify that the other view is implicated by the navigation in the user interface; and
responsively communicate a request to a file system to retrieve the data structure associated with the other view;
wherein the program instructions further comprise a view module that when executed directs the processing system to enable presentation, in the user interface, of the other view by communicating the data structure to a user interface system that surfaces the plurality of components and the email.

14. The apparatus of claim 10 wherein the presentation format of the other view comprises a format in which to present the email in the user interface.

15. The apparatus of claim 14 wherein the plurality of views comprises an inbox view, a sent messages view, and a preview view.

16. The apparatus of claim 10 wherein:
the email application directs the processing system to identify a subset of the plurality of views comprising more than one of the plurality of views; and
the storage module directs the processing system to store the email in a subset of the plurality of data structures that correspond to the subset of the plurality of views.

17. The apparatus of claim 10 wherein:
the service module further directs the processing system to translate the format of the email into a presentation format of the view, wherein the presentation format of the view differs from the format of the email; and
the storage module further directs the processing system to store the email:
in the presentation format of the view in association with the view; and
in the plurality of data structures in the order based at least on the priority assigned to each of the plurality of views.

18. The apparatus of claim 10 further comprising the processing system and a user interface system, wherein the processing system executes the program instructions and wherein the user interface system displays the other view in the user interface.

19. A method for facilitating a user interface to a service comprising:
enabling presentation, in the user interface, of an initial view;
receiving data from the service comprising a plurality of service items for subsequent presentation in at least one other view of a plurality of views rendered in the user interface to the service;
identifying in which of a plurality of data structures corresponding to the plurality of views to store each of the plurality of service items;
before storing the plurality of service items in the plurality of data structures, translating a format of each of the plurality of service items into a presentation format in which the plurality of service items are displayed when the other view is rendered in the user interface, wherein the presentation format in which the plurality of service items are displayed when the other view is rendered in the user interface differs from the format of each of the plurality of service items;
storing, in the presentation format in which the plurality of service items are displayed when the other view is rendered in the user interface and in the plurality of data structures in an order based at least on a priority assigned to each of the plurality of views, the plurality of service items;
in response to an event associated with at least a service item of the plurality of service items that triggers a transition from the initial view to a subsequent view of the plurality of views, identifying that the subsequent view is implicated by the event and responsively retrieving a data structure of the plurality of data structures corresponding to the subsequent view; and
processing the data structure to render the subsequent view in the user interface.

20. The method of claim 19 wherein the service comprises an email service, wherein the plurality of service items comprises a plurality of emails, wherein the initial view comprises a view of an email inbox, wherein the subsequent view comprises a view of a folder, and wherein the method further comprises.

* * * * *